UNITED STATES PATENT OFFICE.

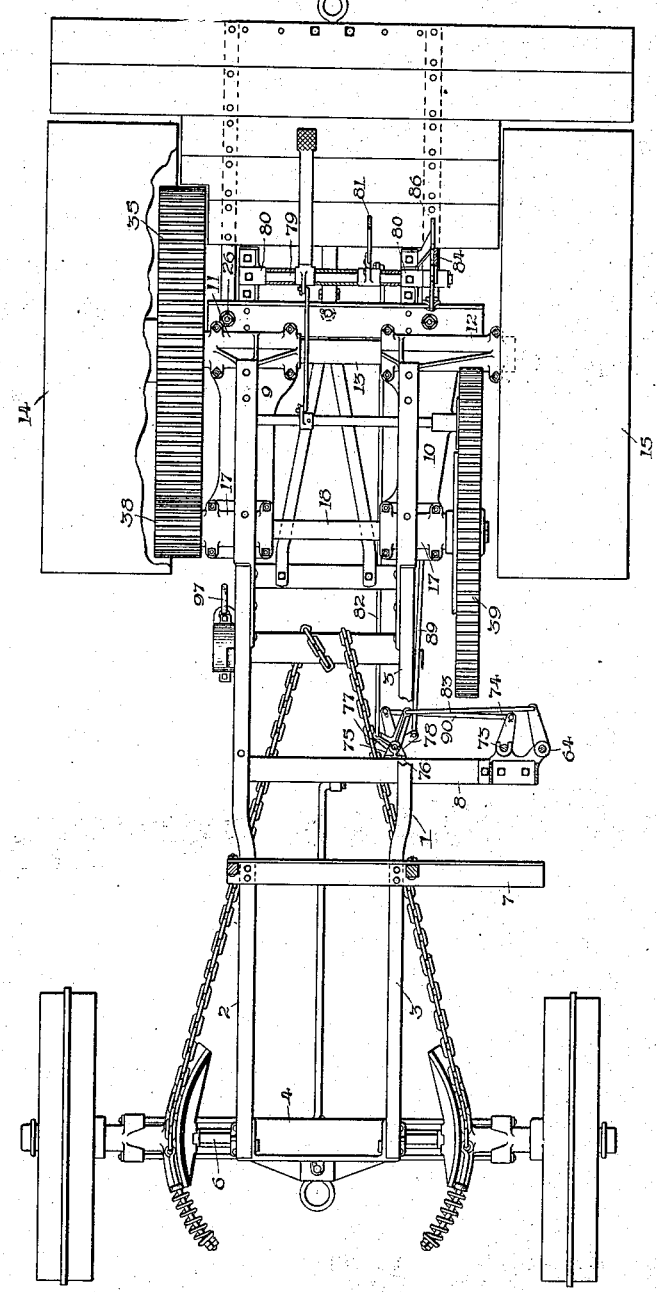

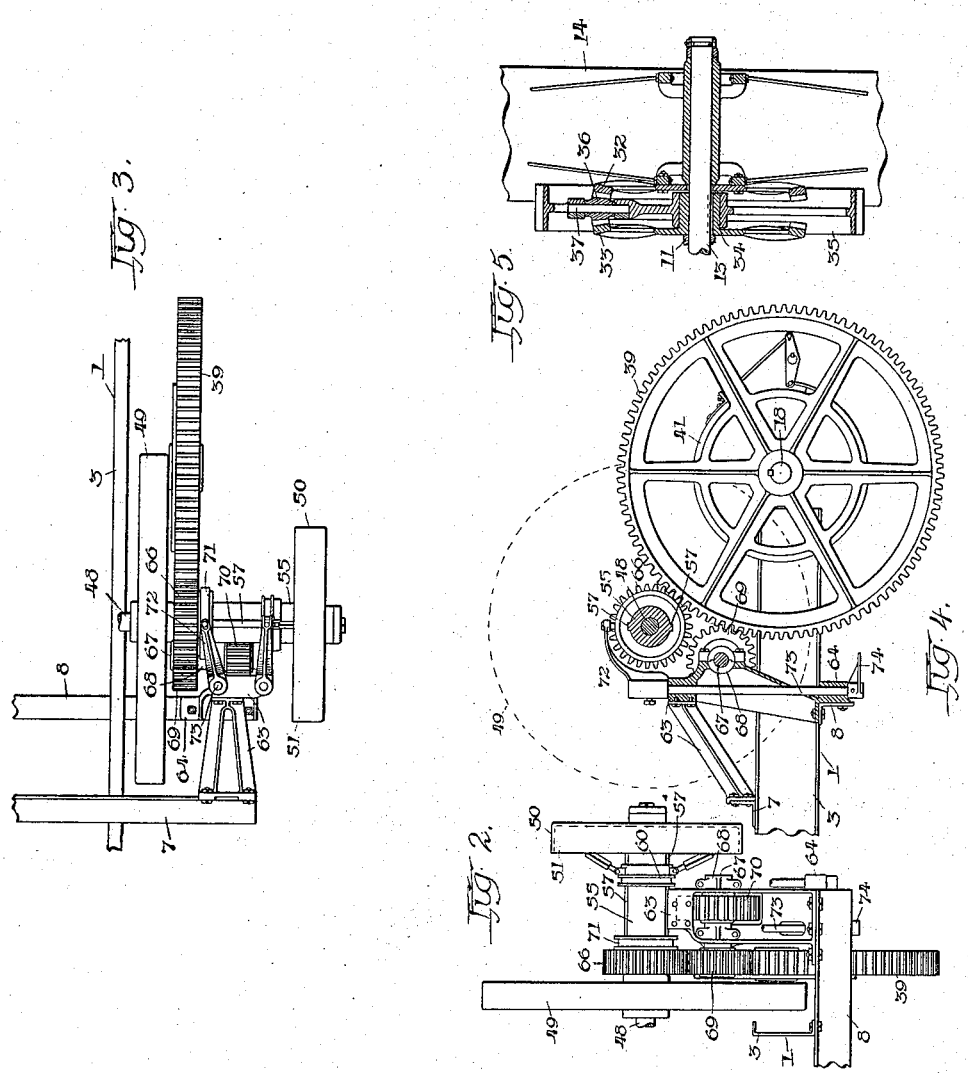

HENRY A. WATERMAN, LYFORD C. BRADLEY, AND WILLIAM K. ANDREW, OF MILWAUKEE, WISCONSIN, ASSIGNORS, BY MESNE ASSIGNMENTS, TO INTERNATIONAL HARVESTER CORPORATION, A CORPORATION OF NEW JERSEY.

POWER-TRANSMISSION GEARING.

1,157,133.     Specification of Letters Patent.     Patented Oct. 19, 1915.

Application filed April 30, 1910. Serial No. 558,651.

*To all whom it may concern:*

Be it known that we, HENRY A. WATERMAN, LYFORD C. BRADLEY, and WILLIAM K. ANDREW, citizens of the United States, residing at Milwaukee, in the county of Milwaukee and State of Wisconsin, have invented certain new and useful Improvements in Power-Transmission Gearing, of which the following is a specification.

Our invention relates to power transmission gearing, and is designed in particular for use in connection with traction engines of the type having an explosive engine as the motive power, and consists in an improved construction of transmitting motion from the engine to the traction wheels, its object being to provide a construction having few parts, strong and durable and efficient in operation. We attain these objects by means of the mechanism illustrated by the accompanying drawings, in which—

Figure 1 is a top plan view of the truck frame with the engine removed; Fig. 2 is a front elevation illustrating the manner of transmitting motion from the engine shaft to the secondary driving shaft and the manner of reversing the direction of rotation thereof; Fig. 3 is a top plan view of Fig. 2; Fig. 4 is a side elevation of Fig. 3, with some of the parts removed; and Fig. 5 is a detail illustrating the differential gear connection between the secondary driving shaft and the traction wheels.

The same reference characters designate like parts throughout the several views.

1 represents a truck frame, having right and left-hand main sill members 2 and 3, preferably made of channel steel, connected at their forward ends by means of a bolster member 4, that is flexibly connected with a front steering axle 6. Secured to the upper sides of the main sills, intermediate their ends, is a transverse frame member 7, and in rear thereof, and to their lower sides, is secured the transverse frame member 8, the two transverse members being extended beyond the main sill upon the left-hand side of the machine for a purpose to be described later.

To the rear ends of the main sills 2 and 3 are secured truck frame members 9 and 10, respectively, that are provided with journal bearings 11 and 12 at their rear ends, in which is journaled the rotatable axle 13, upon the ends of which are right and left-hand traction wheels 14 and 15, and 17 represents journal bearings near the forward ends of said truck frame members that are adapted to receive a transverse secondary power transmitting shaft 18. Secured to the hub of the right-hand traction wheel, at its inner end, is a bevel gear wheel 32, and 33 represents a bevel gear wheel having a hub portion 34 secured to the axle adjacent the wheel 32. 35 represents a large spur gear member journaled upon the hub 34 and having bevel pinions 36 journaled upon radially arranged pins 37 carried by said spur gear and meshing with the bevel gear wheels upon opposite sides thereof in a manner to provide a differential gear connection between the large spur gear member, the axle and the traction wheels.

38 represents a pinion secured to the secondary power transmitting shaft 18, upon one end thereof, and adapted to mesh with the spur gear 35, and 39 represents a large spur gear wheel secured to the opposite end of said shaft.

48 represents an engine shaft, having fly wheels 49 secured to opposite ends thereof, one only being shown, said shaft being extended beyond the fly wheel upon the left-hand side of the machine, and having secured thereto a clutch member 50, including a rim portion 51, the inner surface of which is adapted to frictionally engage with friction shoes in any preferred way.

55 represents a sleeve loosely mounted upon the engine shaft between one of said fly wheels and clutch member 50. Sleeve 55 is provided with oppositely disposed longitudinally arranged feathers 57 throughout its length. Slidably mounted upon the sleeve 55, between the collar 58 and the fly wheel, is a spur pinion 66, rotatable with the sleeve and adapted to engage directly with gear wheel 39 in a manner to rotate it in a direction to cause the tractor to move forward.

67 represents a transverse countershaft journaled in a bearing 68 forming part of a bracket member 63 secured to the transverse frame bars 7 and 8 and having a pinion 69 secured to its inner end that meshes with gear wheel 39, and a pinion 70 secured to its outer end that is adapted to engage with the sliding pinion 66 in a manner to cause the gear wheel 39 to rotate in an opposite direction. The hub of the pinion 66 is provided with a peripheral groove 71 that is adapted to receive a shipping fork 72 secured to the upper end of a vertical rock shaft 73, that is journaled in bracket 63 at its upper end, and in a bracket 64 secured to frame bar 8 at its lower end, and secured to its lower end is an arm 74.

75 represents a bracket secured to the transverse frame member 8 and having a vertical shaft 76 secured therein.

77 represents a bell crank lever journaled upon the upper end of shaft 76, and 78 a like lever journaled upon its lower end.

79 represents a transverse rock shaft journaled in bearings 80 mounted upon the truck frame, and 81 represents a hand lever loosely mounted upon said shaft intermediate said bearings, the hand lever being connected with the swinging arm of the bell crank lever 77 by means of a rod 82, the other arm of the bell crank lever being connected with arm 65 at the lower end of shaft 62 by means of a link 83.

84 represents a hand lever loosely mounted upon shaft 79 and having a common form of sliding spring pressed detent mounted thereon and adapted to engage with a fixed notched sector 86 in a manner to secure the lever in any desired position of adjustment. The hand lever is provided with a depending arm that is connected with one arm of the bell crank lever 78 by means of a rod 89, the other arm of the bell crank lever being connected with the arm 74 at the lower end of vertical shaft 73 by means of a link 90.

In operation in order that motion may be communicated to pinion 66 the operator will throw hand lever 81 forward, rocking bell crank lever 77 about its pivot, which, through its link connection with the vertical shaft 62, rocks the latter in a manner to cause the clutch shipping fork 61 to slide the clutch controlling collar in a direction to cause engagement of the friction shoes with the clutch member secured to the engine shaft in a manner to communicate motion to the sleeve 55 and pinion 66. The toggle link connecting the clutch controlling collar with the levers upon which the friction shoes are mounted will be in a self-sustained position one side of the plane at right angles to the axis of the engine shaft, as is common in this type of clutch mechanism. There are three notches in the sector 86, and when the detent is engaged with the middle one, the connections between the hand lever and the pinion shipping fork 72 are such as to hold the pinion 66 in a neutral position between the spur gear 39 and the pinion 70 secured to the countershaft 67. If the hand lever be thrown forward so that the detent rests in the front notch, pinion 66 will be moved into direct engagement with the spur gear 39 and thereby transmit motion to the traction wheels in a forward direction. If the hand lever be thrown rearward in a manner to cause engagement of the detent with the rear notch in the sector, pinion 66 will be moved into engagement with pinion 70 and through the shaft 67 and pinion 69 communicate motion to spur gear 39 and traction wheels in a reverse direction.

What we claim as our invention, and desire to secure by Letters Patent, is:

A power transmitting gear mechanism including, in combination, a gear supporting frame including a vertically arranged bracket, a primary power transmitting shaft carried by said frame, a secondary power transmitting shaft carried by said frame, a gear wheel secured to said secondary shaft, a sleeve loosely journaled upon said primary shaft, and clutch mechanism operative to connect said sleeve with said shaft, a pinion slidably mounted upon said sleeve and adapted to rotate therewith, a countershaft journaled in a bearing forming part of said bracket, pinions secured to opposite ends of said countershaft, one of said pinions engaging with said gear wheel and the other adapted to mesh with said sliding pinion, and means for controlling the position of said sliding pinion in a manner to cause it to engage with said countershaft pinion or said gear wheel or remain in a neutral position, said means including a vertical shaft mounted in bearings carried by said bracket and having an arm secured to its upper end and engaging with said sliding pinion, an arm secured to the lower end of said shaft, a bell crank lever mounted upon said gear frame, a hand lever mounted upon said gear frame, and link connections between said hand lever and said bell crank lever and between the latter and the arm at the lower end of said vertical shaft.

HENRY A. WATERMAN.
LYFORD C. BRADLEY.
WILLIAM K. ANDREW.

Witnesses:
B. C. WAIT,
S. A. POWERS.

Copies of this patent may be obtained for five cents each, by addressing the "Commissioner of Patents, Washington, D. C."